(No Model.)
A. J. MOSHER.
CLUTCH.
No. 533,394. Patented Jan. 29, 1895.
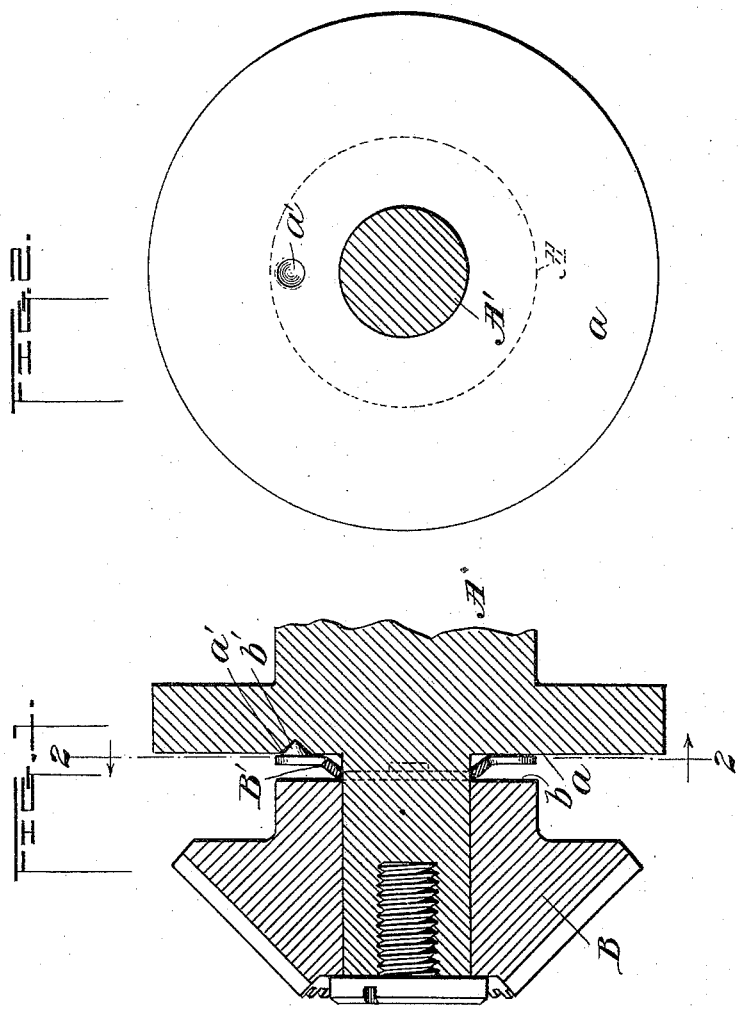
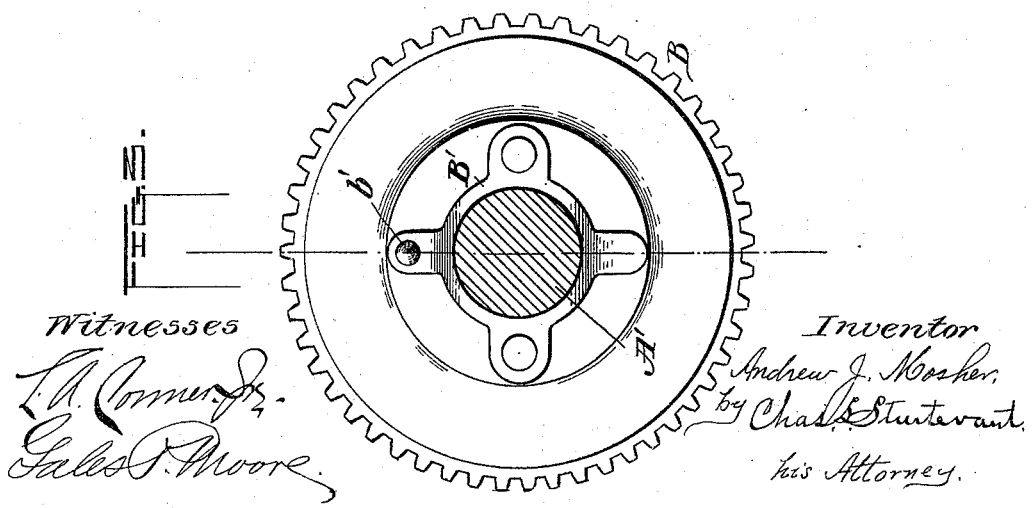
Witnesses
T. A. Conner Jr.
Gales P. Moore
Inventor
Andrew J. Mosher,
by Chas. E. Sturtevant.
his Attorney.

UNITED STATES PATENT OFFICE.

ANDREW J. MOSHER, OF BOSTON, MASSACHUSETTS.

CLUTCH.

SPECIFICATION forming part of Letters Patent No. 533,394, dated January 29, 1895.

Application filed June 12, 1891. Serial No. 395,980. (No model.)

*To all whom it may concern:*

Be it known that I, ANDREW J. MOSHER, of Boston, in the county of Suffolk and Commonwealth of Massachusetts, have invented certain Improvements in Clutches, of which the following, taken in connection with the accompanying drawings, is a specification.

My invention relates to clutches, my object being to provide such a construction for use in connection with machinery of the nature of tack and nail machines, that when a driven part is suddenly stopped, no breaking or straining will result therefrom, and to this end my invention consists in the various matters hereinafter described.

In the accompanying drawings, which illustrate my invention, Figure 1 is a view partly in section of a shaft to which my invention is applied. Fig. 2 is a face view looking to the right upon the line 2—2 of Fig. 1, and Fig. 3 is a similar view looking to the left.

In the drawings A is a driving shaft, the end of which is reduced to form the part $A'$ thus leaving the face $a$, and in this face is a cavity $a'$. Journaled upon the part $A'$ of the driving shaft, is a driven gear B adapted to transmit motion to the desired parts of the machine. It will thus be seen that the driving shaft and driven gear have faces which lie opposite each other. Fastened upon the face of the gear B is a plate of spring metal $B'$ upon which is a projection $b'$, so placed that it normally rests in the cavity $a'$ upon the driving shaft. The tension of this plate is such that under ordinary circumstances the projection will remain in the cavity and the gear be rotated with the driving shaft, but should the driven part be suddenly and unexpectedly stopped, the plate will yield and permit the driving shaft to continue its rotation without breaking or twisting any of the parts, as would be the case were the connection between the driving and driven members A and B a rigid one.

Several advantages are gained by the use of the present construction. In the first place, the faces $a$ and $b$ lying opposite each other, bearing surfaces are provided so that it is only necessary to slip the spring plate between said faces, thus dispensing with the use of all additional collars, &c. Again, in some types of machines (and notably in machines for distributing tacks and nails, this being the type with which my invention is particularly designed to be used) it is essential that when a stoppage occurs, the driven part shall not be set in motion as soon as the obstruction is removed, but shall remain inactive until the driving part shall have completed the revolution during which the stoppage occurred, and the parts shall occupy the same relation to one another that they did at the time of stoppage. To this end it is that the cavity $a'$ and the projection $b'$ are found particularly useful. These parts are so combined that the projection $a'$, being in the cavity $b'$, marks the point of commencement of revolution of the driven part, and in case of a stoppage of the said driven part during a partial revolution thereof, these points are forced out of contact and mark the relation to be reestablished in order to preserve the desired regularity of working the machine.

Having thus described my invention, what I claim as new, and desire to secure by Letters Patent, is—

A clutch comprising a driving member, a driven member, said members having faces which lie substantially opposite each other, one of said faces being provided with a cavity, and a plate of spring material between said faces and secured to the one other than that in which the cavity is formed, said plate being provided with a projection normally entering said cavity; substantially as described.

Signed at Boston, Massachusetts, this 3d day of December, A. D. 1890.

ANDREW J. MOSHER.

Witnesses:
C. B. TUTTLE,
E. E. HAMILL.